(12) United States Patent
Zhao et al.

(10) Patent No.: US 9,705,773 B2
(45) Date of Patent: Jul. 11, 2017

(54) PARALLELIZED NETWORK TRAFFIC FLOW AVAILABILITY SIMULATION USING STOCHASTIC PROCESS AND TRAFFIC ENGINEERING ALGORITHMS

(71) Applicant: Google Inc., Mountain View, CA (US)

(72) Inventors: Xiaoxue Zhao, Fremont, CA (US); Emilie Jeanne Anne Danna, Sunnyvale, CA (US); Alireza Ghaffarkhah, Mountain View, CA (US); Ajay Kumar Bangla, San Jose, CA (US); Christoph Albrecht, San Jose, CA (US); Wenjie Jiang, Menlo Park, CA (US); Benjamin Preskill, Berkeley, CA (US); Bikash Koley, Cupertino, CA (US)

(73) Assignee: Google Inc., Mountain View, CA (US)

( * ) Notice: Subject to any disclaimer, the term of this patent is extended or adjusted under 35 U.S.C. 154(b) by 74 days.

(21) Appl. No.: 14/922,879

(22) Filed: Oct. 26, 2015

(65) Prior Publication Data

US 2017/0012848 A1 Jan. 12, 2017

Related U.S. Application Data

(60) Provisional application No. 62/190,551, filed on Jul. 9, 2015.

(51) Int. Cl.
*H04L 12/26* (2006.01)
*H04L 12/751* (2013.01)
(Continued)

(52) U.S. Cl.
CPC ........ *H04L 43/0882* (2013.01); *H04L 41/145* (2013.01); *H04L 41/5009* (2013.01);
(Continued)

(58) Field of Classification Search
CPC .............. H04L 41/145; H04L 41/5038; H04L 41/5009; H04L 47/24; H04L 43/0882; H04L 43/50
See application file for complete search history.

(56) References Cited

U.S. PATENT DOCUMENTS 6,836,756 B1 * 12/2004 Gruber .................. H04L 41/145
370/242
7,969,886 B1 * 6/2011 Hoichman .......... H04L 41/0896
370/229
(Continued)

OTHER PUBLICATIONS

Bulteau, Stephane, and El Khadiri, Mohamed. "A Monte Carlo Simulation of the Flow Network Reliability using Importance and Stratified Sampling" [Research Report] RR-3122, 1997. <inria-00073568>.

(Continued)

*Primary Examiner* — Khaled Kassim
*Assistant Examiner* — Syed S Ali
(74) *Attorney, Agent, or Firm* — McDermott Will & Emery LLP

(57) ABSTRACT

The present disclosure provides a probabilistic framework that can calculate the probability of fulfilling demands for a given set of traffic flows. In some implementations, the probability of fulfilling demands can be based on the probability of infrastructure component failures, shared risk link groups derived from a cross-layer network topology, and traffic engineering (TE) considerations. The consideration of the cross-layer network topology enables the systems and methods described herein to account for the relationship between the physical and logical topologies.

30 Claims, 4 Drawing Sheets

(51) Int. Cl.
H04L 12/801 (2013.01)
H04L 12/851 (2013.01)
H04L 12/24 (2006.01)

(52) U.S. Cl.
CPC ......... H04L 41/5038 (2013.01); H04L 43/04 (2013.01); H04L 43/50 (2013.01); H04L 45/02 (2013.01); H04L 47/127 (2013.01); H04L 47/24 (2013.01); H04L 41/12 (2013.01); H04L 41/142 (2013.01)

(56) References Cited

U.S. PATENT DOCUMENTS

| | | | |
|---|---|---|---|
| 8,037,163 B1 | 10/2011 | Lo et al. | |
| 8,531,978 B2* | 9/2013 | McReynolds | H04L 41/142 370/217 |
| 2006/0171316 A1* | 8/2006 | El-Sakkout | H04Q 3/66 370/235 |
| 2008/0120081 A1* | 5/2008 | Chandrashekar | H04L 41/0896 703/13 |
| 2009/0185496 A1 | 7/2009 | Doverspike et al. | |
| 2013/0250805 A1* | 9/2013 | Hansmann | H04L 41/12 370/254 |
| 2014/0078888 A1 | 3/2014 | Jenkins et al. | |

OTHER PUBLICATIONS

Feres, Renato. Notes for Math 450 Continuous-time Markov chains and Stochastic Simulation, Disponivel em< http://www.math.wustl.edu/23Cferes/Math450Lect05.pdf (2007).

Rubino, Gerardo, and Tuffin, Bruno. An Introduction to Monte Carlo Methods and Rare Event Simulation, QEST Tutorial, Sep. 2009.

International Search Report and Written Opinion mailed Sep. 28, 2016 in PCT Application No. PCT/US2016/040833.

* cited by examiner

PARALLELIZED NETWORK TRAFFIC FLOW AVAILABILITY SIMULATION USING STOCHASTIC PROCESS AND TRAFFIC ENGINEERING ALGORITHMS

CROSS-REFERENCE TO RELATED APPLICATIONS

This application claims priority to U.S. Provisional Patent Application No. 62/190,551 filed on Jul. 9, 2015 and titled "PARALLELIZED NETWORK TRAFFIC FLOW AVAILABILITY SIMULATION USING STOCHASTIC PROCESS AND TRAFFIC ENGINEERING ALGORITHMS," which is herein incorporated by reference in its entirety.

BACKGROUND

Datacenter network operators (including content providers owning networking infrastructure and operation), and network service providers often offer network bandwidth as a product to (internal or external) customers. When selling the network bandwidth, the provider ensures a service level objective, which includes well-defined measurement metrics for measuring the traffic performance of the network. Networks are often over provisioned to ensure the network is capable of providing the service level objective.

SUMMARY OF THE DISCLOSURE

According to one aspect of the disclosure, a method for determining traffic flow availability includes receiving an indication of a physical topology, an indication of a logical topology, and a plurality of traffic demands. The physical topology includes a plurality of physical links, and the logical topology includes a plurality of logical links between a plurality of nodes. The method also includes receiving a cross-layer network model that maps the logical topology to the physical topology. Then, iteratively and for a predetermined number of cycles, the method includes generating a failure sample that indicates a failure of a plurality of physical links in the physical topology. A logical topology model is updated responsive to the failure of the random plurality of physical links in the failure sample based on the cross-layer network model. Then, with a traffic engineering simulator, the method includes determining if the updated local topology model is capable of satisfying the plurality of traffic demands.

According to another aspect of the disclosure, a system for determining traffic flow availability includes a storage medium storing processor executable instructions and at least one processor coupled to the storage medium. Execution of the processor executable instructions causes the at least one processor to receive an indication of a physical topology, a logical topology, and a plurality of traffic demands. The physical topology includes a plurality of physical links, and the logical topology includes a plurality of logical links between a plurality of nodes. Execution of the computer executable instructions also causes the at least one processor to receive a cross-layer network model that maps the logical topology to the physical topology and assign a random capacity to each of the plurality of logical links. Execution of the computer executable instructions also causes the at least one processor to iteratively, for a predetermined number of cycles, generate a failure sample that indicates a failure of a plurality of the physical links in the physical topology. Then the at least one processor updates a logical topology model responsive to the failure of the plurality of physical links in the failure sample and the cross-layer network model. Execution of the computer executable instructions also causes the at least one processor to determine, with a traffic engineering simulator, if the updated local topology model is capable of satisfying the plurality of traffic demands.

According to another aspect of the disclosure, computer readable medium includes processor executable instructions. Execution of the processor executable instructions causes at least one processor to receive an indication of a physical topology, a logical topology, and a plurality of traffic demands. The physical topology includes a plurality of physical links, and the logical topology includes a plurality of logical links between a plurality of nodes. Execution of the computer executable instructions also causes the at least one processor to receive a cross-layer network model that maps the logical topology to the physical topology and assign a random capacity to each of the plurality of logical links. Execution of the computer executable instructions also causes the at least one processor to iteratively, for a predetermined number of cycles, generate a failure sample that indicates a failure of a plurality of the physical links in the physical topology. Then the at least one processor updates a logical topology model responsive to the failure of the plurality of physical links in the failure sample and the cross-layer network model. Execution of the computer executable instructions also causes the at least one processor to determine, with a traffic engineering simulator, if the updated local topology model is capable of satisfying the plurality of traffic demands.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description of the invention.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale; emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Following below are more detailed descriptions of various concepts related to, and implementations of, the various concepts introduced above and discussed in greater detail below. The concepts may be implemented in any of numerous ways, as the described concepts are not limited to any particular manner of implementation. Examples of specific implementations and applications are provided primarily for illustrative purposes.

The present disclosure provides a probabilistic framework that can calculate the probability of fulfilling demands for a given set of traffic flows. In some implementations, the probability of fulfilling demands can be based on the probability of infrastructure component failures, shared risk link groups derived from a cross-layer network topology model, and traffic engineering (TE) considerations. The consideration of the cross-layer network topology model enables the systems and methods described herein to account for the relationship between the physical and logical topologies.

Figure 1A:
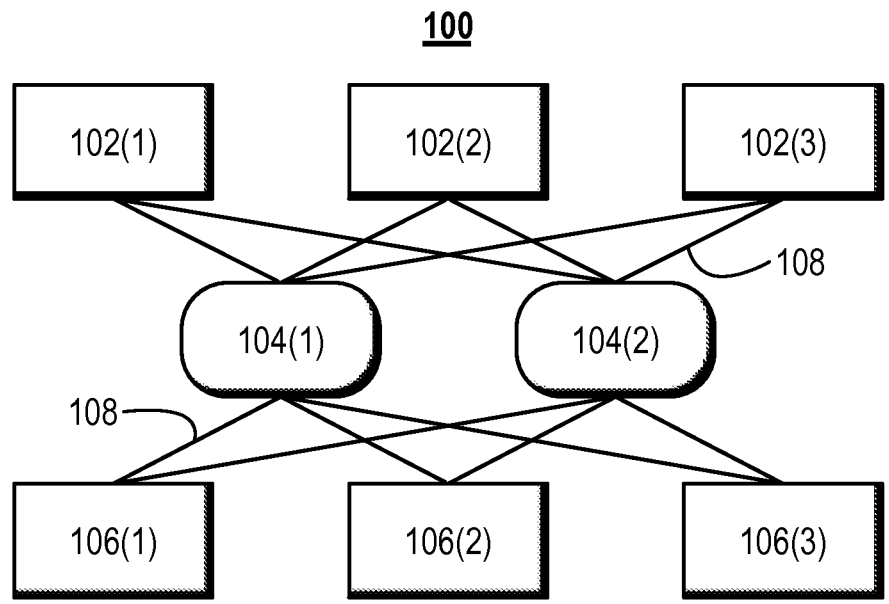
FIG. 1A illustrates block diagram of an example physical topology of a network.

FIG. 1A illustrates block diagram of an example physical topology of a network 100. The network 100 includes upper level nodes 102(1)-102(3) (generally referred to as upper level nodes 102) and lower level nodes 106(1)-106(3) (generally referred to as lower level nodes 106). The upper level nodes 102 are coupled to the lower level nodes 106 through switches 104(1) and 104(2) (generally referred to as switches 104). The upper level nodes 102 and the lower level nodes 106 are coupled to the switches 104 through physical links 108.

In some implementations, the switches 104 are wavelength selective switches or other types of switches, such as, optical circuit switches (OCSs). Each switch 104 includes a plurality of north ports to which the upper level nodes 102 are coupled and a plurality of south ports to which the lower level nodes 106 are coupled. The interconnection of the north ports and the south ports within the switches 104 are configurable and the interconnection of the north ports and the south ports determine how the upper and lower level nodes are interconnected. In some implementations, a physical topology is referred to as a L1 topology, which refers to the first level in the open systems interconnection (OSI) stack.

Figure 1B:
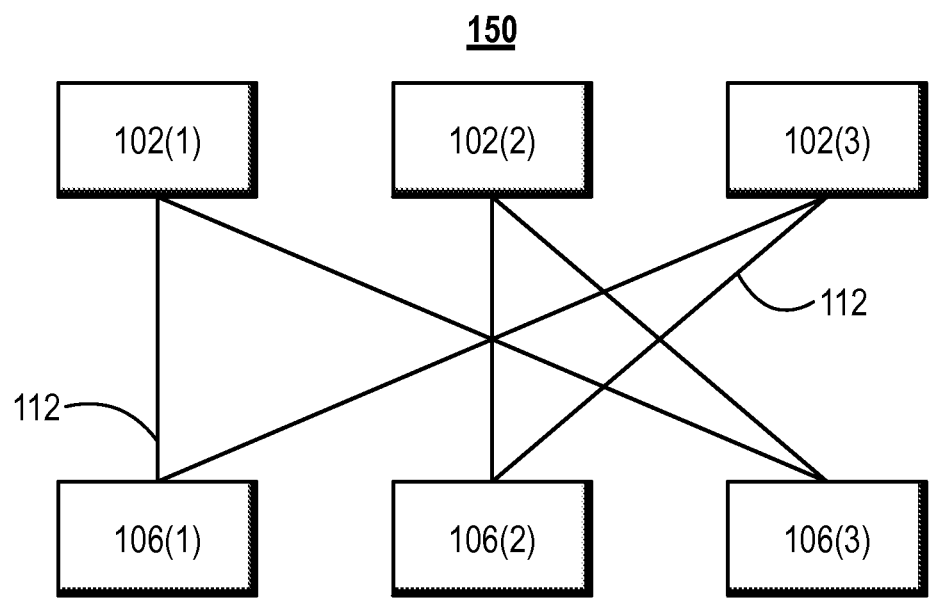
FIG. 1B illustrates a block diagram of an example logical topology implemented on the physical topology of network illustrated in FIG. 1A.

FIG. 1B illustrates a block diagram of an example logical topology 150 implemented on the physical topology of network 100. The logical topology 150 defines how the upper level nodes 102 communicate across the physical topology of the network 100 created by the switches 104 to the lower level nodes 106. For example, one of the switches 104 couples upper level node 102(1) to lower level node 106(1), and the other switch 104 couples upper level node 102(1) to lower level node 106(3). Logical links 112 form the connection between the upper level nodes 102 and lower level nodes 106 within the logical topology 150. The mapping between the physical topology of the network 100 and the logical topology 150 can be referred to as a cross-layer network topology. In some implementations, a logical topology is referred to as a L3 topology, which refers to the third level in the open systems interconnection (OSI) stack.

Figure 2:
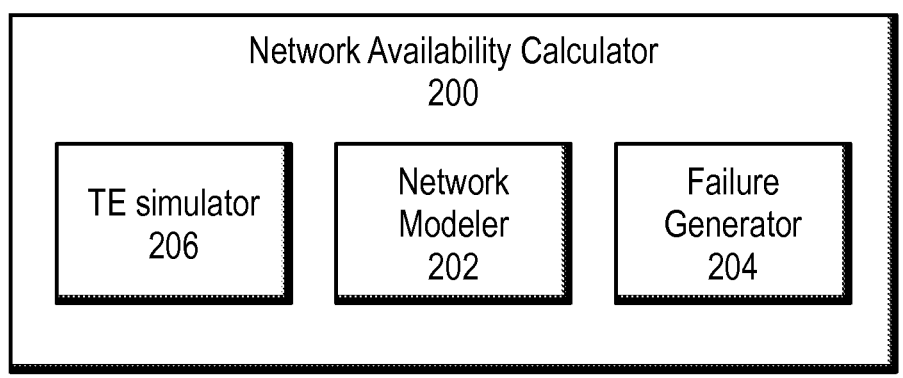
FIG. 2 illustrates a block diagram of an example network availability calculator.

FIG. 2 illustrates a block diagram of an example network availability calculator 200. The network availability calculator 200 includes a network modeler 202 that is configured to receive data indicating a physical topology (also referred to as a L1 topology) and a logical topology (also referred to as a L3 topology). The network availability calculator 200 also includes a failure generator that is configured to generate random failures for each of the links in the physical topology. The network availability calculator 200 includes a traffic engineering (TE) simulator 206 that receives the data generated by, or received by, the network modeler 202 and the failure generator and calculates whether the network defined by the L1 and L3 topologies is capable of fulfilling traffic demands.

The network availability calculator 200 is implemented by special purpose logic circuitry (e.g., a FPGA (field programmable gate array) or an ASIC (application specific integrated circuit)) and/or a general purpose computing device. The network availability calculator 200 can also include, in addition to hardware, code stored on a computer readable medium that, when executed, causes the network availability calculator 200 to perform one or more of the methods described herein.

The network modeler 202 of the network availability calculator 200 is configured to receive L1 and L3 topologies and to also receive cross-layer network models that map the relationship between the L1 and L3 topologies. The cross-layer network model indicates which components in the L1 topology fulfill the logical connections in the L3 topology. For example, and referring to FIGS. 1A and 1B, a logical link exists between node 102(1) and node 106(3). The logical link could be provided through switch 104(1) or switch 104(2). The network modeler 202 can represent the L3 topology as a graph, denoted as G. Each logical link in G has a capacity based on the capacity of the physical links in the underlying L1 topology. In some implementations, a random variable is assigned to each link to capture possible degradation based on possible failures. The possible failures can include, but are not limited to, fiber cuts, amplifier failures, switch/router failures, line card failures, control plane failures, and link drains. The network modeler 202 saves the vector of link capacities as X. In some implementations, multiple logical links traverse the same physical link and are termed shared risk link groups (SRLGs) because if the physical link were to fail, each of the logical links traversing the same physical link would also fail. Accordingly, the random vector of link capacities X is a correlated random vector because some link capacities are correlated to one another due to the SRLGs.

The failure generator 204 of the network availability calculator 200 generates combinations of possible failures that can occur in the network. Each of the possible failures can be referred to as a failure sample, and includes the failure of one or more links and other network devices. In some implementations, the failure generator 204 accepts past failure data, such as the probability that a link or network device will fail at a specified time T. In some implementations, the possible failures generated by the failure generator 204 are the failures most likely to happen in the network based on the past failure data. In other implementations, the failure generator 204 can receive user instructions for the generation of possible failures. For example, a user may wish to run "what-if analysis" to determine the consequences if a specific failure occurs. In these cases, the user can indicate to the failure generator 204 which links and network devices should fail and how they should fail.

The TE simulator 206 of the network availability calculator 200 is a traffic engineering simulator that receives data from the network modeler 202, failure generator 204, and other sources to calculate which demands across the L3 topology are satisfied and which are not met. The process of calculating which demands are satisfied is discussed further in relation to the method illustrated in FIG. 3.

Figure 3:
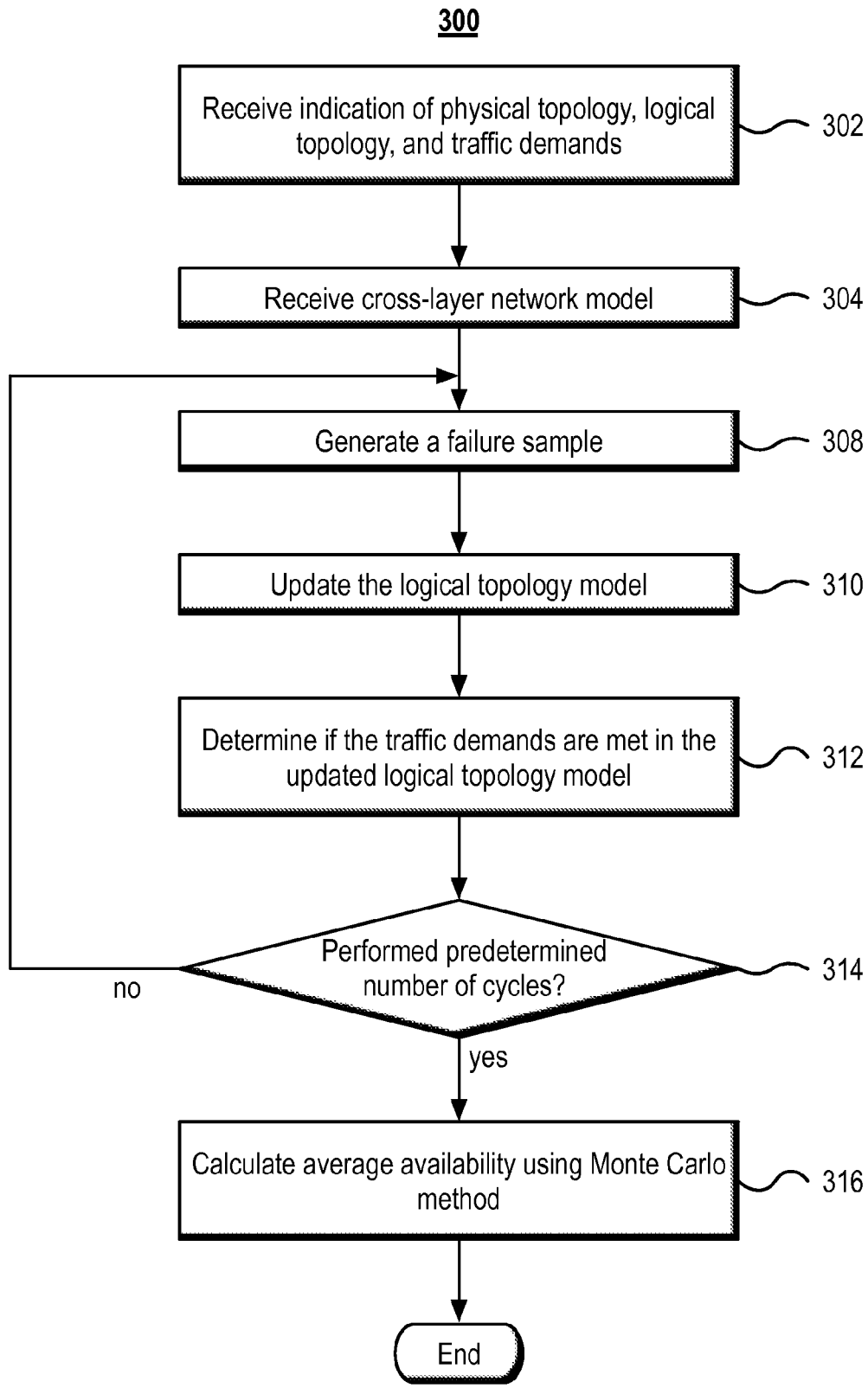
FIG. 3 illustrates a flowchart of an example method for determining traffic flow availability using the network availability calculator illustrated in FIG. 2.

FIG. 3 illustrates a flowchart of an example method 300 for determining traffic flow availability. The method 300 includes receiving an indication of a physical topology, a logical topology, and traffic demands (step 302). The method 300 also includes receiving a cross-layer network model (step 304). Iteratively, for a predetermined number of cycles, the method 300 includes generating a failure sample (step 308), and updating the logical topology model responsive to the failure sample (step 310). A TE simulator is then used to determine if the updated logical topology model is capable of satisfying the traffic demands (step 312). The method 300 includes calculating the average availability of the network using a Monte Carlo method (step 316). As described herein, the availability of the network or the availability of a traffic flow refers to the network having the ability to fulfill the flows. For example, if a flow is available, then the network is able to route the flow between its desired source destination.

As set forth above, the method 300 includes receiving data representing a physical topology, a logical topology, and traffic demands (step 302). As described above in relation to FIG. 2, the data is received by the network modeler 202 and the failure generator 204 of the network availability calculator 200. Some data, such as traffic demands can be provided directly to the TE simulator 206. In some implementations, the network availability calculator 200 also accepts as inputs data representing a mean time to repair a failure, a mean time between failures for each link and network device, other failure data correlated to the age or uptime of the network components. The network availability calculator 200 can also receive a set of service level objectives (SLOs), which include metrics (e.g., a percentage of time a bandwidth availability between two nodes is above a predetermined threshold) required by a specific product, application, or contract.

Referring to FIG. 3, the method 300 includes receiving a cross-layer network model that maps the logical topology to the physical topology (step 304). The cross-layer network model maps the logical topology to the physical topology such that the network availability calculator can determine which logical links are affected when a root cause of failure occurs in the physical topology.

Figure 4:
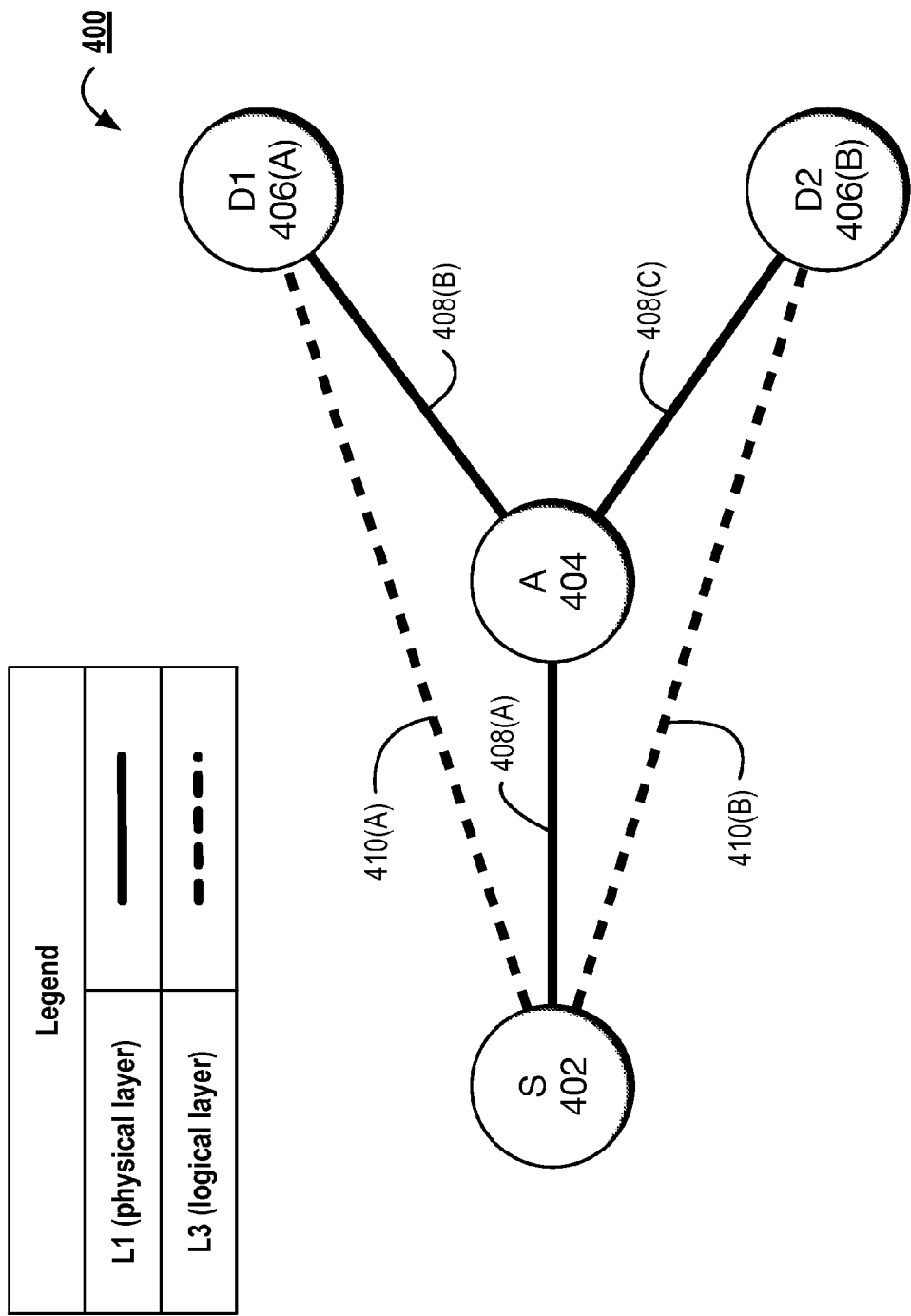
FIG. 4 illustrates an example cross-layer map for a network.

FIG. 4 illustrates a cross-layer map for a network 400. The network 400 includes a source node 402 that is coupled to two destination nodes 406(A) and 406(B) via a routing node 404. In the physical layer, the nodes are connected via physical links 408. In the logical layer, the source node 402 is logically coupled to the destination node 406(A) and the destination node 406(B) by logical links 410(A) and 410(B), respectively. The cross-layer network model indicates the logical link 410(A) is fulfilled by physical links 408(A) and 408(B) and logical link 410(B) is fulfilled by physical links 408(A) and 408(C).

In some implementations, the capacity of one or more links is modified to determine whether the unavailability a given flow is due to topology constraints (e.g., not enough diverse paths between the source and the destination of the flow) or if the capacity of the links plays a role and the unavailability is due to congestion. In such implementations, the network availability calculator increases the capacity of the links to a hypothetically large value (e.g., 100 times the actual capacity of the link) to eliminate the effect of link capacity during outages. The method 300 can be continued with the large capacity links, and the resulting availability values represent the upper bounds of the flow availabilities where only topology constraints of the network are taken into account.

The method 300 also includes, iteratively, for a predetermined number of cycles, generating a failure sample (step 308). The failure sample includes a set of random failures in the physical links (or other network devices) of the physical topology. In some implementations, the set of failures is based on the failure rates provided to the network availability calculator. In other implementations, the random failure samples in the L3 topology are generated by failing underlying L1 links. Using the cross-layer map enables the simulation of demand fulfillment problems caused by failures in the L1 topology. For example, and also referring to FIG. 4, a failure of the physical link 408(A) would cause capacity issues in both logical link 410(A) and 410(B), while a failure in the physical link 408(B) would only cause capacity issues in logical link 410(A).

In some implementations, it may be difficult to identify and thus model the root cause of a failure in a network. Failures where the cause of the downtime is difficult to understand or model are analyzed by generating failure samples by first gathering the capacity probability distribution of each logical link (e.g., what is the probability that a given link has a specific capacity). The failures for which a root cause is known are subtracted from the capacity probability distribution to provide a residual probability distribution of the link capacity. In some implementations, it is assumed that failures with unknown root causes only occur in (or affect) the logical links. The failures with unidentified root causes are analyzed by generating failure samples from the residual probability distribution. In some implementations, the failures include a mix of unknown and known root causes.

Still referring to FIG. 3, once a failure sample is generated, the logical topology model is updated responsive to the simulated failures in the physical topology (step 310). For example, and also referring to FIG. 4, if the physical link 408(B) completely fails, the logical topology in the model will no longer include the logical link 410(A). Updating the logical topology model also includes determining the capacity of each of the links in the logical network. In some implementations, the link capacity is represented as a variable with two values—the first value representing the normal capacity of the link and the second value representing the capacity of the link when the link fails. In some implementations, when the logical link fails the logical link completely fails. In other implementations, logical link partially fails—for example, due to router line card failure or other failures that partially reduces the capacity of the link rather than causing a complete link failure.

In some implementations, as illustrated in FIG. 3, the method 300 cycles a predetermined number of times, generating and testing a new failure sample each cycle. Because the network can include SRLGs, different failures in the physical network can result in the same updated logical topology model. In these instances, the network availability calculator can review the past cycles to determine if a traffic engineering calculation has been calculated for the current logical topology model before proceeding to the next step of method 300. For example, if the network availability calculator determines the present failure sample results in a logical topology model analyzed in a previous cycle, the network availability calculator may memorialize the failure sample as having generated the same logical topology model as a previous cycle and return to step 308 of the method 300 to generate a new failure sample. As described further below, the methods described herein can also be executed in parallel to reduce computational time.

The method 300 also includes determining, with a traffic engineering simulator, if the updated local topology model is capable of satisfying the plurality of traffic demands (step 312). The TE simulator of the network availability calculator can accept as input the updated logical topology model, the vector of link capacities X, and a set of traffic demands D. The TE simulator returns $f(X, D)$, which is a vector function that indicates which flow demands are not either fulfilled or are partially fulfilled. For example, when the link capacities are supplied in a two-value form, $f(X, D)$ equals 1 when a demand is fulfilled and 0 when a demand that is not fulfilled. The dimension of the output vector is equal to the number of the demands in D.

In some implementations, the traffic engineering simulator is also configured to calculate and track latency. For example, for each of the logical topologies, the traffic engineering simulator computes the set of paths on which each flow is routed and also computes the wide area network (WAN) latency (e.g., the propagation delay) of each path. The computed latency statistics are combined across topology samples to generate a complete latency distribution under the failure scenarios. The latency distribution is compared to the latency percentile objectives defined in the service level objective to determine whether a flow is meeting its latency objective.

Next, the method 300 includes determining if the predetermined number of cycles was performed (step 314). If the predetermined number of cycles were performed the method 300 can end. In some implementations, network availability calculator then calculates the expected value (statistical average) of the vector function $f(X,D)$ using Monte Carlo methods (step 316). The network availability calculator reports the expected value as the availability of the flows in the logical network. In some implementations, the availability of the flows is compared against the SLO to determine if the logical topology model satisfies the SLO. If the predetermined number of cycles have not yet been performed, then the method 300 includes generating a new failure sample.

When performing the above method 300, the accuracy of the input data received in step 302 affects the accuracy of the output calculations. In some implementations, gathering accurate failure probabilities is difficult because network components are continuously updated, replaced, and improving. The relation between component failure probability data and flow availability is highly nonlinear and has no closed form. In some implementations, the sensitivity of a failure probability is analyzed using a finite difference method. The finite difference method includes first running the method 300 with the original failure probability data and then running the method 300 a second time responsive to slightly modifying the failure probability data (e.g., the probability of failure can be slightly increased or decreased). The difference between the two calculations is then normalized by the change made to the original failure probability data to create the modified failure probability data to provide an indication of the sensitivity of the results to variations in the component failure probabilities.

In some implementations, the sensitivity of the results to variations in the component failure probabilities is calculated by performing method 300 with modified failure probability data that is directly estimated from flow availability samples observed during the simulation of actual failure data. Performing the method 300 with the actual failure data enables a single simulation to be run rather than a different simulation where in each simulation the failure data for only one network component is modified.

As described in relation to step 302 of method 300, in some implementations, the simulation is provided inputs that include a time dimension. The inclusion of a time dimension enables the computation of expected flow availability and also the distribution of how often (and long) flow outages may occur. The inclusion of the time dimension into the simulation enables short flow outages to be distinguished from long flow outages, which are indistinguishable from one another when a time dimension is not present. In these implementations, the network availability calculator provides as output the average availability for each flow and the distribution (provided as a histogram) of the outage duration for each flow.

In implementations that include a time dimension, the state of the physical network is modeled as a continuous time Markov Chain Monte Carlo simulation:

$$Y(y)=(y_e(t))_{e \in E}$$

where y(t) represents the state of the corresponding logical link at time t. In some implementations, the time Markov Chain includes two states (0 and 1) representing total failure and fully functional. In other implementations, the time Markov Chain can include M number of states to represent states between total failure and fully functional. The transition between the states can be governed by failure and repair rates that are estimated from historical data.

If the logical topology include N logical links, each with M states, the number of possible states Y is $M^N$, and the differential equation governing the change in the distribution of link states is:

$$\frac{d}{dt}p(Y(y)) = Q^T p(Y(t))$$

where Q is a $M^N \times M^N$ rate transition matrix with one row and one column for each of the possible network states.

In some implementations, it is assumed that each of the logical links are independent, and the probability of simultaneous state changes on more than one L1 link is zero. In these implementations, each state has (M−1)*N possible neighboring states to which it can transition.

In some implementations, the time dimensioned model is simulated by mapping the model with a hold-and-jump process. In this process the amount of time the network remains in that specific state is exponentially distributed with a rate equal to sum of all the transition rates of the neighboring states. The probability of jumping from state i to state j in the hold-and-jump process is defined by:

$$R_{ij}=Q_{ij}-Q_{ii} \text{ if } j \neq i$$

$$R_{ij}=0 \text{ else}$$

In some implementations, the methods described herein are used to estimate the expected availability for fractional demand fulfillment for each of the flows. A flow's availability can range from 0% satisfied to 100%, and underlying services treat different levels of availability differently. For example, if the underlying service detects that the flow availability is 90% satisfied, the service can reduce its sending rate to increase flow availability. By estimating the expected availability for fractional demand fulfillment, networks can be planned and analyzed that meet a range of bandwidth requirements. For example, networks can be planned that to meet a lower service level objective that requires 100% flow availability or a higher service level object that satisfies less than 100% flow availability.

In these implementations, a flow's availability is defined by a 4-tuple that includes the source, destination, bandwidth requirement, and service class. A cumulative distribution functions (CDF) is calculated by sampling a fraction of satisfied demands for a flow over a plurality of topologies.

For example, for each flow $f$, the traffic engineering simulator computes the fraction of satisfied demands $p_f$. Then, $p_f$ is sampled over N topologies to generate a series of fractions of satisfied demands $\{p_f\}$. The CDF represents the percentage of the flow's unsatisfied demand and is calculated as $\{1-p_f\}$. For each point (x, y) on the CDF curve, the y value represents the fraction of the time that the percentage of satisfied demands is greater than or equal to (1-x). The (1-x) value provides the lower bound for the fractional demand available.

In some implementations, the network uses a multi-path label switching (MPLS) auto bandwidth protocol where flows are not arbitrarily splittable and the finding and resizing of the label-switch paths (LSP) is dynamic. These types of bandwidth protocols can affect the accuracy of the traffic engineering simulations for calculating the availability for fractional demand fulfillment. In these implementations, the original flow can be divided into S number of sub-flows, each with equal demand. In some implementations, S is equal to the number of label-switch paths between each pair of nodes. Also, the sub-flows are randomly ordered to simulate the nondeterministic nature of the MPLS protocol. Each sub-flow is routed on the network using a constrained shortest path first (CSPF) algorithm, which returns a feasible or infeasible solution. The original flow's fraction of satisfied demand is calculated as the fraction of the number of feasible sub-flows over the total number of sub-flows. Because the finding and resizing of the label switch paths is dynamic, the sampling mechanism is a joint space sampling mechanism that samples both failure scenarios and flow orders to provide a high confidence on the availability result given a fixed number of samples.

In some implementations, to perform the methods described herein on a computationally reasonable time scale, the steps of the methods are run in parallel. The method described herein can be run in parallel on hundreds, thousands, or tens of thousands of computational machines.

In an implementation using a Monte Carlo simulation that does not include a time dimension, data is first input into the system. Second, random seeds are created. Based on each of the random seeds a sequence of failure samples (e.g., random root cause failures) are generated and the resulting logical topology model is created. The generation of the sequence of failure samples and creation of the resulting logical topology models for each of the random seeds is performed in parallel. Because, as described above, the same logical topology can be created by different root cause failures, the logical topologies are deduplicated to remove repeated logical topologies, and a different one of the unique logical topologies is distributed to each of the computational machines. Each separate computational machine simulates the traffic demands on its unique logical topology model by simulating a plurality of flows traversing the logical topology model. The computational machine outputs an indication of each of the plurality of flows that were not fulfilled. Each of the computational machines simulates traffic demands using the same plurality of flows. A different computational machine then calculates, for one of the plurality of flows, an average availability of each of the plurality of flows.

In implementations using a Markov Chain Monte Carlo simulation, which does include a time dimension, the time intervals in which each of the logical topologies is present is also tracked. The parallel simulation of the Markov Chain Monte Carlo simulation begins as described above in relation to the parallel simulation of the Monte Carlo simulation. A plurality of random seeds is created, and the total time to be analyzed is split into a plurality of intervals. The complete timeline of the continuous-time Markov chain is divided into consecutive segments. Each of the segments is identified by a unique identifier referred to as a "grain." The grain is used to identify and sort each time interval during the simulation. As described above, the same logical topology can result from the same root cause failure. Additionally, the same or different root cause failures can also result in the same logical topology at different points in time. In first shuffle phase, each unique logical topology model, together with its corresponding time intervals and grains, is transferred to a single computational machine. Accordingly, each different logical topology model is transferred to a different computational machine.

Next, each unique logical topology model is simulated separately with the traffic demands. The simulation provides the flows that are available and the flows that are not available. Each flow that is not available is output together with the corresponding grain and the time intervals of the logical topology.

Then the output time intervals are grouped together based on their corresponding flow and grain pair. All the time intervals associated with each flow and grain pair are transferred to a single computational machine and the time intervals are sorted into chronological order. Neighboring time intervals without gaps therebetween are combined into a continuous time interval, which represents a continuous outage. Processing the sorted time interval data, a histogram of the outage duration for each flow and grain pair is calculated. Next, the histograms are grouped by grain and merged to form a single histogram for each flow.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed:

1. A processor implemented method for determining traffic flow availability, the method comprising:
   receiving by a processor an indication of a physical topology comprising a plurality of physical links, a logical topology comprising a plurality of logical links between a plurality of nodes, and a plurality of traffic flow demands;
   receiving an indication of an average failure probability for each of the plurality of physical links; receiving a cross-layer network model that maps the logical topology to the physical topology; iteratively, for a predetermined number of cycles:
   generating a failure sample, responsive to the indication of the average failure probability, indicating a failure of a plurality of physical links in the physical topology; updating the logical topology model responsive to the failure of the plurality of physical links in the failure sample and the cross-layer network model, wherein updating the logical topology model comprises calculating a capacity degradation for each of the plurality of logical links responsive to the failure sample; and
   determining, with a traffic engineering simulator, if the updated logical topology model is capable of satisfying the plurality of traffic flow demands;
   calculating an average availability for a fraction of a flow demand from the plurality of traffic flow demands; and outputting the calculated average flow availabilities.

2. The method of claim 1, wherein the failure sample indicates a random failure of the plurality of physical links in the physical topology.

3. The method of claim 1, further comprising:
   receiving a failure rate and a repair rate for each of the plurality of physical links; and generating the failure sample response to the failure rate and the repair rate for each of the plurality of physical links.

4. The method of claim 1, further comprising calculating an average availability of each of the plurality of traffic flow demands with a Monte Carlo simulation.

5. The method of claim 4, further comprising determining if the average availability of the plurality of traffic flow demands satisfies a service level objective (SLO).

6. The method of claim 1, further comprising determining if a latency of a plurality of traffic flow demands satisfies a SLO.

7. The method of claim 1, further comprising calculating an average availability of each of the plurality of traffic flow demands across the predetermined number of cycles.

8. The method of claim 1, wherein the failure sample comprises at least one failure with a known root cause and at least one failure without a known root cause.

9. The method of claim 1, further comprising determining a distribution of durations of the plurality of traffic flow demands is not met.

10. The method of claim 1, wherein each of the predetermined number of cycles are computed in parallel by different processors.

11. A system for determining traffic flow availability, the system comprising a non-transitory storage medium storing processor executable instructions and at least one processor coupled to the storage medium, wherein execution of the processor executable instructions causes the at least one processor to: receive an indication of a physical topology comprising a plurality of physical links, a logical topology comprising a plurality of logical links between a plurality of nodes, and a plurality of traffic flow demands;
receive an indication of an average failure probability for each of the plurality of physical links; receive a cross-layer network model that maps the logical topology to the physical topology; iteratively, for a predetermined number of cycles: generate a failure sample, responsive to the indication of the average failure probability, indicating a failure of a plurality of physical links in the physical topology;
update the logical topology model responsive to the failure of the plurality of physical links in the failure sample and the cross-layer network model, wherein updating the logical topology model comprises calculating a capacity degradation for each of the plurality of logical links responsive to the failure sample; and
determine, with a traffic engineering simulator, if the updated logical topology model is capable of satisfying the plurality of traffic flow demands; calculate an average availability for a fraction of a flow demand from the plurality of traffic flow demands; and
output the calculated average flow availabilities.

12. The system of claim 11, wherein the failure sample indicates a random failure of the plurality of physical links in the physical topology.

13. The system of claim 11, wherein execution of the processor executable instructions further causes the at least one processor to:
receive a failure rate and a repair rate for each of the plurality of physical links; and generate the failure sample response to the failure rate and the repair rate for each of the plurality of physical links.

14. The system of claim 11, wherein execution of the processor executable instructions further causes the at least one processor to calculate an average availability of each of the plurality of traffic flow demands with a Monte Carlo simulation.

15. The system of claim 14, wherein execution of the processor executable instructions further causes the at least one processor to determine if the average availability of the plurality of flows satisfies a service level objective (SLO).

16. The system of claim 11, wherein execution of the processor executable instructions further causes the at least one processor to determine if a latency of a plurality of traffic flow demands satisfies a SLO.

17. The system of claim 11, wherein execution of the processor executable instructions further causes the at least one processor to calculate an average availability of each of the plurality of traffic flow demands across the predetermined number of cycles.

18. The system of claim 11, wherein the failure sample comprises at least one failure with a known root cause and at least one failure without a known root cause.

19. The system of claim 11, wherein execution of the processor executable instructions further causes the at least one processor to determine a distribution of durations of the plurality of traffic flow demands is not met.

20. The system of claim 11, execution of the processor executable instructions further causes the at least one processor to execute the predetermined number of cycles in parallel.

21. A non-transitory computer readable medium comprising processor executable instructions stored thereon, the instructions when executed by at least one processor cause the at least one processor to:
receive an indication of a physical topology comprising a plurality of physical links, a logical topology comprising a plurality of logical links between a plurality of nodes, and a plurality of traffic flow demands;
receive an indication of an average failure probability for each of the plurality of physical links;
receive a cross-layer network model that maps the logical topology to the physical topology;
iteratively, for a predetermined number of cycles: generate a failure sample, responsive to the indication of the average failure probability, indicating a failure of a plurality of physical links in the physical topology;
update the logical topology model responsive to the failure of the plurality of physical links in the failure sample and the cross-layer network model, wherein updating the logical topology model comprises calculating a capacity degradation for each of the plurality of logical links responsive to the failure sample; and
determine, with a traffic engineering simulator, if the updated logical topology model is capable of satisfying the plurality of traffic flow demands;
calculate an average availability for a fraction of a flow demand from the plurality of traffic flow demands; and
output the calculated average flow availabilities.

22. The computer readable medium of claim 21, wherein the failure sample indicates a random failure of the plurality of physical links in the physical topology.

23. The computer readable medium of claim 21, wherein execution of the processor executable instructions further causes the at least one processor to: receive a failure rate and a repair rate for each of the plurality of physical links; and generate the failure sample response to the failure rate and the repair rate for each of the plurality of physical links.

24. The computer readable medium of claim 21, wherein execution of the processor executable instructions further causes the at least one processor to calculate an average availability of each of the plurality of traffic flow demands with a Monte Carlo simulation.

25. The computer readable medium of claim 24, wherein execution of the processor executable instructions further causes the at least one processor to determine if the average availability of the plurality of flows satisfies a service level objective (SLO).

26. The computer readable medium of claim 21, wherein execution of the processor executable instructions further causes the at least one processor to determine if a latency of a plurality of traffic flow demands satisfies a SLO.

27. The computer readable medium of claim 21, wherein execution of the processor executable instructions further causes the at least one processor to calculate an average availability of each of the plurality of traffic flow demands across the predetermined number of cycles.

28. The computer readable medium of claim 21, wherein the failure sample comprises at least one failure with a known root cause and at least one failure without a known root cause.

29. The computer readable medium of claim 21, wherein execution of the processor executable instructions further causes the at least one processor to execute the predetermined number of cycles in parallel.

30. The computer readable medium of claim 21, wherein execution of the processor executable instructions further causes the at least one processor to determine a distribution of durations of the plurality of traffic flow demands is not met.

* * * * *